United States Patent Office.

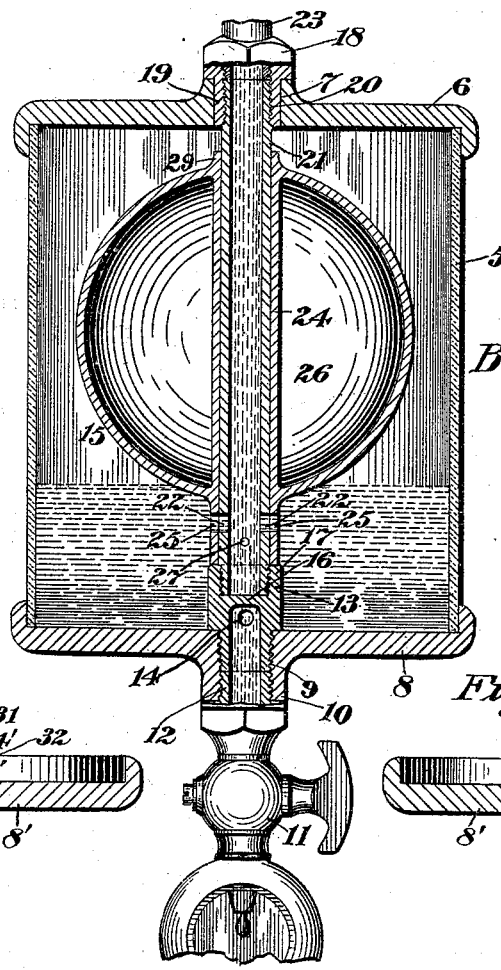

ROBERT L. WHITE, OF HARTFORD, CONNECTICUT.

OIL-CUP.

SPECIFICATION forming part of Letters Patent No. 719,543, dated February 3, 1903.

Application filed March 17, 1902. Serial No. 98,532. (No model.)

*To all whom it may concern:*

Be it known that I, ROBERT L. WHITE, a citizen of the United States, residing in Hartford, in the county of Hartford and State of Connecticut, have invented certain new and useful Improvements in Oil-Cups, of which the following is a specification.

This invention relates to oil-cups, and has for its object to provide means whereby the oil from a circulatory system or other source of supply may be automatically fed to the oil-cups in quantities sufficient to supply the needs of distribution from the cups.

Another object of the invention is to provide means whereby the supply to the journals from a circulatory system may be had without pressure.

In carrying out my invention I may employ such oil-cups as are in common use, wherein there is a central vertical tube for carrying the oil from the oil-chamber, either by remodeling the tube or by substituting a new tube having a partition therein and a hole below and a hole above the partition in communication with the interior of the oil-cup, constituting oil-outlets and oil-inlets, respectively. The upper part of the tube may be connected to the circulatory system or source of supply and the bottom part to the petcock or drip leading to the journal. In conjunction with the central tube will be provided a suitable float carrying means for cutting off the inlet-opening upon the rise of the oil within the cup to a predetermined level, but which cutting-off means will not impede the distributing-outlet. A convenient form of carrying out the invention may be to mount a sleeve upon the central tube, the sleeve being connected with a float of any desirable shape and having holes or ports registering when in its lower position with the inlet-ports from the tube, so that upon the falling of the oil within the chamber the ports will be opened and a new supply of oil may enter the chamber, and upon oil entering the chamber faster than it flows out the sleeve will be carried upward upon the tube and cut off the ports.

The form of structure above referred to may be applied to existing forms of oil-cups, my invention being described in relation to such a form as will be available for use with the cups now being used, so that it will not be necessary to require the abandonment of the major parts of the cups in use upon the change to a system embodying my invention.

In the drawings accompanying and forming part of this specification, Figure 1 is a vertical central sectional view of a form of my invention applied to an oil-cup, the inlet-ports being shown as open. Fig. 2 is a view, partly broken away, on the same line as Fig. 1, but showing the inlet-ports as closed. Fig. 3 is a central vertical sectional view of the lower part of a cup, showing a modification; and Fig. 4 is a view at right angles thereto.

The oil-cup (designated in a general way by B) may be of any usual or convenient form of construction and is here shown as embodying a glass cylindrical casing 5, having a flanged top plate 6, through which is a central opening 7, and a flanged bottom plate 8, having a central screw-threaded opening 9 and a hub 10 around said opening. As shown in Figs. 1 and 2, the petcock 11, leading to the drip or journal, is secured to the bottom plate by a screw-threaded nipple 12, in engagement with the screw-threaded hub 10. Screwed within the opening 9 is shown a nipple 13, having openings or ports 14, communicating with the inside of the chamber 15, and having a partition 16 above the port or opening, the nipple being shown as having an extension 17 above the partition, being there provided interiorly with screw-threads.

Located in the opening 7 in the top plate is shown a nut 18, having a hub 19, plain on the outer side, where it is in contact with the plate, and screw-threaded interiorly to receive the upper screw-threaded portion 20 of a central tube 21, which tube at its lower end is screw-threaded into the nipple. The lower end of the central tube is shown as provided with ports or openings 22. The nut 18 is shown as connected with a supply-pipe 23, broken away, which is in connection with the source of oil-supply. (Not shown.) The oil enters through such supply-pipe, passes down the central tube through the ports 22 into the oil-chamber, and out of the chamber through the ports 14 down the central tube to the drip and thence to the journal. To regulate the supply of oil to the chamber, there is provided means for automatically cutting off the oil-inlet upon a predetermined rise of oil within the chamber, and for such purpose there is provided a sleeve 24, embracing the central tube and capable of reciprocation thereon, such sleeve being provided with ports 25, capable of registering with the ports 22, when the sleeve is in its lowest position, so as to give free entrance into the chamber to the oil from the source of supply. Secured in any suitable manner to the sleeve is shown a float 26, which in the present instance is shown as spherical and as surrounding the sleeve. For preventing rotation of the tube any suitable means may be employed, such as a pin 27, passing from the central tube through a slot 28 in the sleeve. When the float is in its lowest position, as shown in Fig. 1, the edges of the sleeve may rest upon the top of the extension 17 of the nipple, and when in its uppermost position the end 29 of the sleeve may engage the top plate of the cup, or, if the construction is as shown in the drawings, it will engage the end of the nut 18, thus limiting its downward and upward movements.

In Figs. 3 and 4 the bottom plate 8' is shown substantially similar to the bottom plate in Figs. 1 and 2, and in the present instance the nipple 13' is shown as being screw-threaded into the plate and as having an outside screw-threaded portion 30, upon which the central tube is mounted. Below the partition 16', formed by such construction, are the outlet-ports 14' from the chamber, shown in the present instance as being provided with short tubes 31 and the sleeve 24' as being mounted upon the outside of the central tube and having a split or slotted end 32 for the accommodation of the tubes 31, they serving the purpose of the pin 27 for preventing the rotation of the float. In the present instance when the float (not shown) is in its lowest position its flue or sleeve will rest upon the bottom plate.

The utility of having the tubular form of outlet will be apparent, it being to prevent the cutting off of the outlet upon the descent of the float.

It will thus be seen that upon a reduction of oil within the chamber the float will sink until the ports are opened, when upon more oil entering the chamber than can find escape by the exit-conduit through the passage in the petcock the float will rise and cut off the supply of oil. By this means it will be possible to dispense with a large number of oilers in the engine-room or other place where machinery requiring this character of oiling is used, it simply being required to adjust the petcock to determine the number of drops per minute to pass to the journal, which has been found to give the best results, and the float will prevent the cups from becoming empty or becoming too full. By this means an even flow of oil is had without pressure being exerted upon it.

Although I have shown my invention as applied to a common form of oil-cup, such having been selected because at the present time it will be expedient to place the invention in such a form that existing oil-cups may be utilized, thus saving the expense of replacing them by new ones, yet I do not limit myself to the form of cup shown nor to the exact form and construction of the embodiment of the invention, as many changes in structure may be made without departing from the spirit of my invention.

Having described my invention, what I claim is—

1. In a device of the character specified, the combination of an oil-chamber; a supply-tube passing into the chamber; an inlet from the tube to the chamber; a sleeve mounted thereon to shift transversely to the direction of flow of the oil through the inlet and upon shifting to cut off the inlet; and a float for actuating the sleeve.

2. In an oil-cup embracing a central tube; a partition in the lower portion of the tube; a port in the tube above the partition and a port in the tube below the partition; a float located within the cup; and means rigidly connected to the float for closing one of the openings.

3. In an oil-cup, the combination with an oil-chamber embracing side walls, a top plate and a bottom plate; a tube passing into the oil-chamber through the central portion of the top plate and connecting the interior of the chamber with a source of supply; a tube passing out of the oil-chamber through the central portion of the bottom plate and connecting the interior of the chamber with a point of distribution, the exterior of the tubes within the chamber forming a central rod; a float controlled by the oil within the chamber and guided by the central rod formed by the tubes; and means connected to the float and operable thereby for automatically cutting off the supply of oil to the chamber.

4. The combination with an oil-distributing conduit, of an obstruction in the conduit; an oil-chamber surrounding the conduit opposite the obstruction; a port from the conduit to the chamber at each side of the obstruction; a float embracing the conduit; and means actuated by the float for opening and closing one of the ports.

5. The combination with an oil-distributing conduit, of an oil-chamber; an inlet-port from the conduit to the chamber; an outlet-port from the chamber; a float guided by the conduit; and means carried by the float for closing the inlet-port upon a predetermined rise of level and holding the same closed irrespective of the pressure from the conduit.

6. In an oil-cup, the combination with an oil-chamber, of a central tube passing through the same; an oil-inlet from the tube into the chamber; an oil-outlet from the chamber located in the tube; a partition in the tube between the inlet and outlet; a cut-off for the inlet; and a float located within the chamber and arranged to operate the cut-off.

7. The combination in an oil-cup, of an oil-chamber, embodying a side casing, top and bottom; a central tube for clamping the top and bottom upon the casing; a connection to a source of supply at the top of the tube; a connection to a point of utilization at the bottom of the tube; a partition in the tube within the chamber; an inlet to the chamber from the tube above the partition; an outlet from the chamber to the tube below the partition; means for closing the inlet; and a float for actuating the closing means.

8. The combination, in an oil-cup, of an oil-chamber embodying a side casing, top and bottom; a central tube for clamping the top and bottom upon the casing; a connection to a source of supply at the top of the tube; a connection to a point of utilization at the bottom of the tube; a partition in the tube within the chamber; an inlet from the tube above the partition to the chamber; an outlet from the chamber to the tube below the partition; a sleeve mounted upon the tube and having an opening capable of registering with the outlet to form a port; and a float surrounding the sleeve, arranged upon the rise of level of oil within the chamber to raise the sleeve and close the port.

9. In an oil-cup, the combination with an oil-chamber embodying a cylindrical casing; a top and a bottom plate; a screw-threaded opening within the bottom plate; an opening in the top plate; a nut located in such opening in the top plate and provided with an interior screw-thread; a nipple in screw-threaded engagement with the bottom plate and embracing an outlet-opening from the chamber; a partition in the nipple and an interiorly-screw-threaded extension above the partition; a central tube in screw-threaded engagement with the extension and the nut; openings in the lower part of the central tube; a sleeve mounted upon the central tube and capable of reciprocation thereon and limited in its upward movement by the nut and its downward movement by the extension of the nipple; openings in the lower part of the sleeve; means for preventing the rotation of the sleeve; and a float surrounding the sleeve and secured thereto.

10. In an oil-cup, the combination of an oil-chamber; a tube within the chamber and connected to a source of supply and point of utilization; an inlet-opening from the tube in the chamber; a partition below the inlet; an outlet-opening below the partition; a sleeve surrounding the tube having an opening for registering with the inlet and a portion for cutting off the inlet; a float for actuating the sleeve; an elongated opening in the sleeve; and a tube extending outwardly from the outlet and entering the elongated opening.

ROBERT L. WHITE.

Witnesses:
CHAS. LYON RUSSELL,
C. A. WEED.